United States Patent
Buscema

(10) Patent No.: US 7,788,196 B2
(45) Date of Patent: Aug. 31, 2010

(54) ARTIFICIAL NEURAL NETWORK

(75) Inventor: Paolo Massimo Buscema, Rome (IT)

(73) Assignee: Semeion, Rome (IT)

( * ) Notice: Subject to any disclaimer, the term of this patent is extended or adjusted under 35 U.S.C. 154(b) by 0 days.

(21) Appl. No.: 10/571,602

(22) PCT Filed: Aug. 24, 2004

(86) PCT No.: PCT/EP2004/051891
§ 371 (c)(1),
(2), (4) Date: Oct. 26, 2006

(87) PCT Pub. No.: WO2005/024718
PCT Pub. Date: Mar. 17, 2005

(65) Prior Publication Data
US 2007/0043452 A1    Feb. 22, 2007

(30) Foreign Application Priority Data
Sep. 9, 2003  (EP)  ................... 03425582

(51) Int. Cl.
*G06F 15/18* (2006.01)
*G06N 3/00* (2006.01)
*G06N 3/04* (2006.01)
*G06N 3/08* (2006.01)

(52) U.S. Cl. ............................. 706/25; 706/20; 706/27; 706/31

(58) Field of Classification Search ................ 706/25
See application file for complete search history.

(56) References Cited

OTHER PUBLICATIONS

Lin et al., "Neural Fuzzy Systems", 1996.*
Fahlman et al. (Fahlman), The Cascade-Correlation Learning Architecture, 1991.*
Nilsson, The SRI Artificial Intelligence Center a Brief History, 1984, Technical Note 317.*

* cited by examiner

*Primary Examiner*—Donald Sparks
*Assistant Examiner*—Nathan H Brown, Jr.
(74) *Attorney, Agent, or Firm*—Themis Law

(57) ABSTRACT

An artificial neural network comprises at least one input layer with a predetermined number of input nodes and at least one output layer with a predetermined number of output nodes or also at least one intermediate hidden layer with a predetermined number of nodes between the input and the output layer. At least the nodes of the output layer and/or of the hidden layer and/or also of the input layer carry out a non linear transformation of a first non linear transformation of the input data for computing an output value to be fed as an input value to a following layer or the output data if the output layer is considered.

16 Claims, 12 Drawing Sheets

Representation
of a multi-layer Sine Net

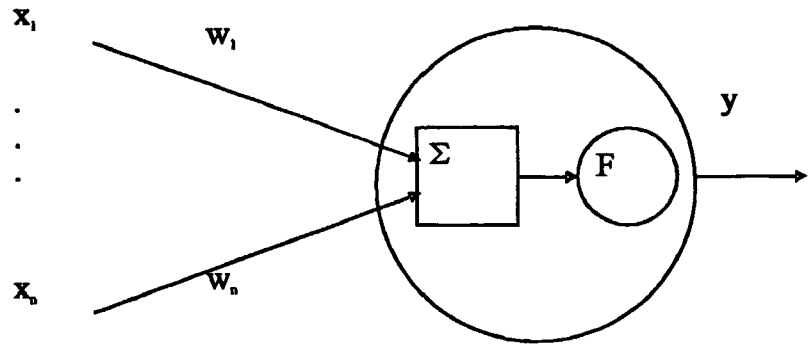
Figure 1 — Conceptual processing in classical networks
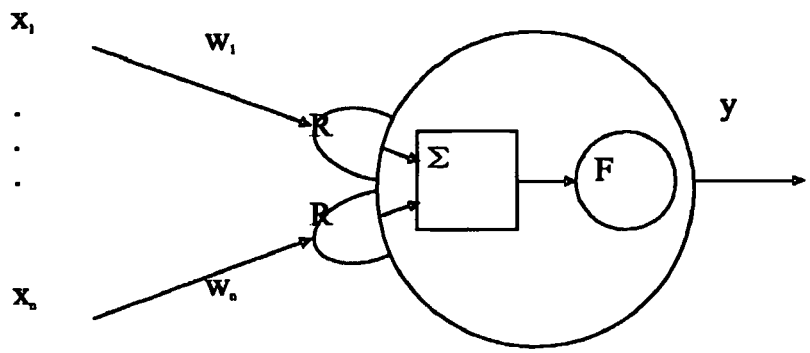
Figure 2 - Conceptual processing in classical Sine Net networks

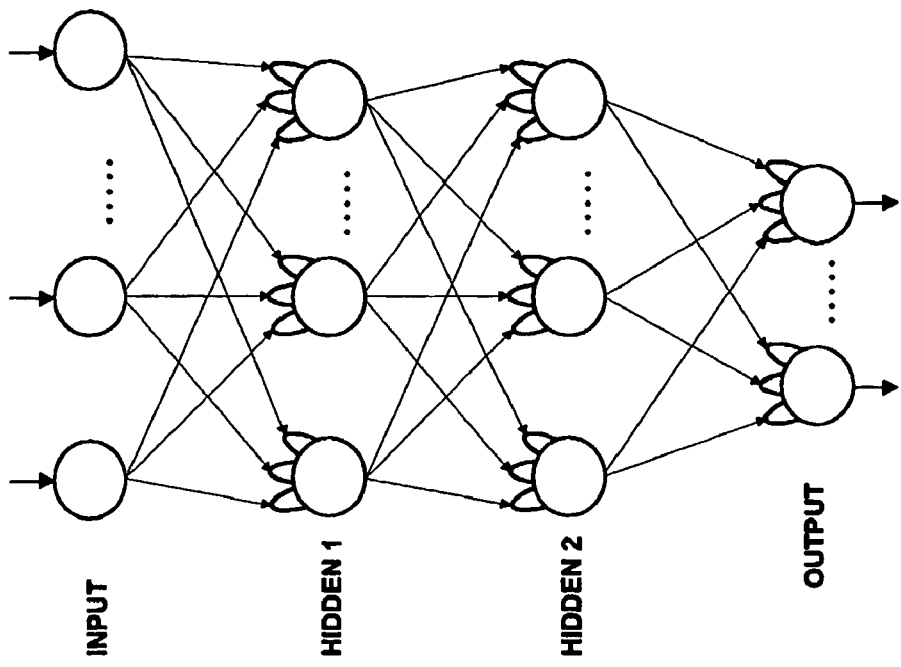
Figure 4 – Representation of a multi-layer Sine Net
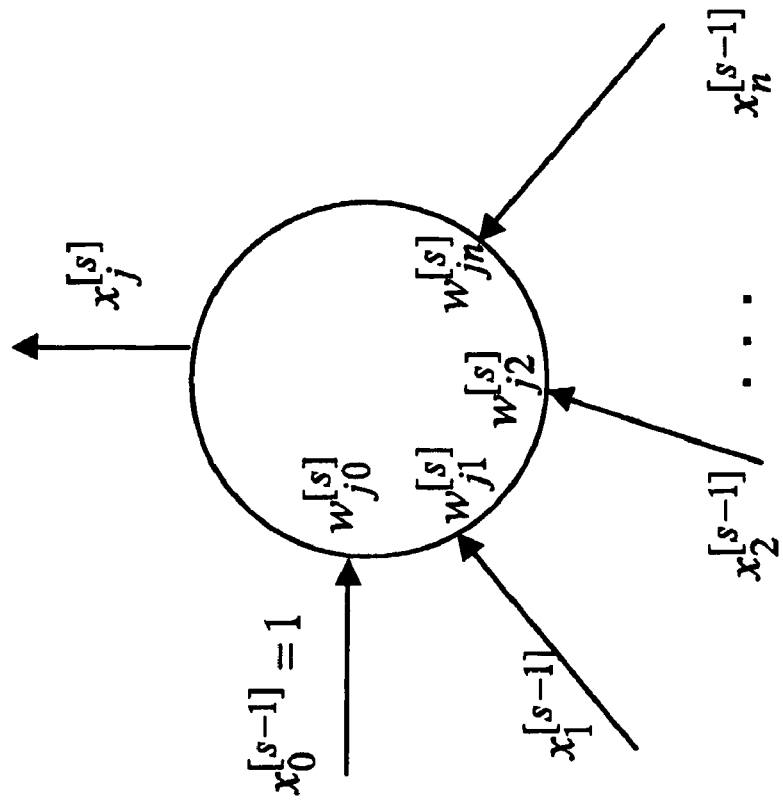
Figure 3 – Node variables for the *j-th* node

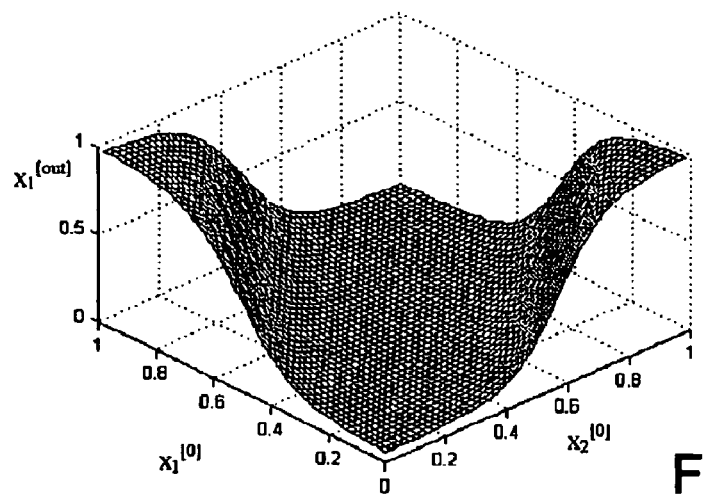
Figure 5 – BP solution of XOR problem
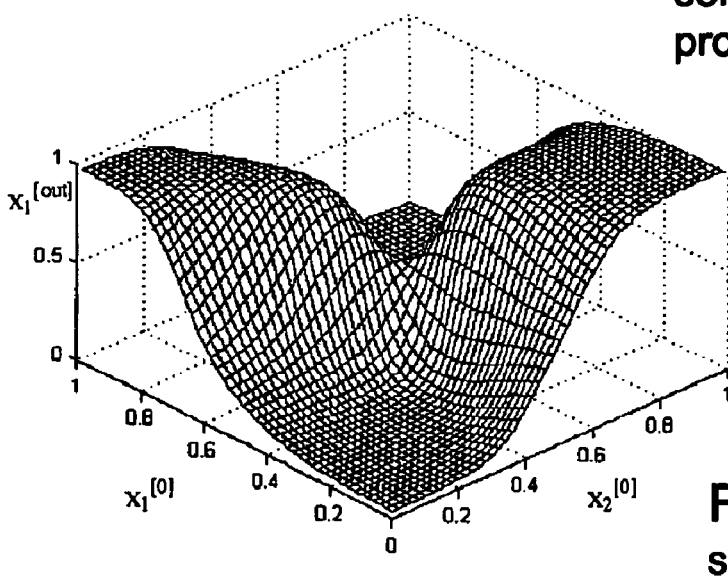
Figure 6 – RBF solution of XOR problem
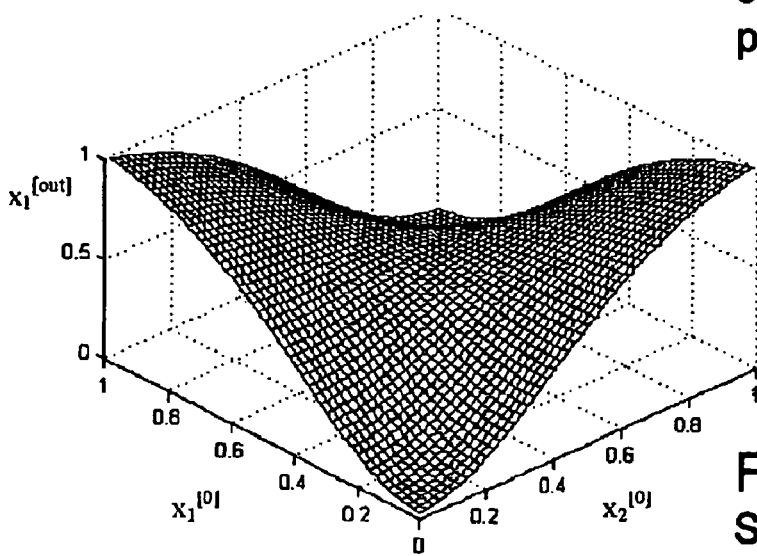
Figure 7 – SN solution of XOR problem.

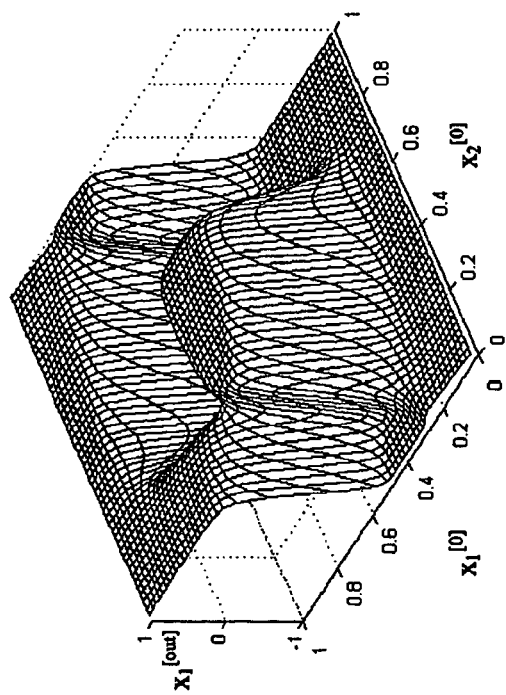
Figure 10 – Back-propagation solution of the two spirals problem.
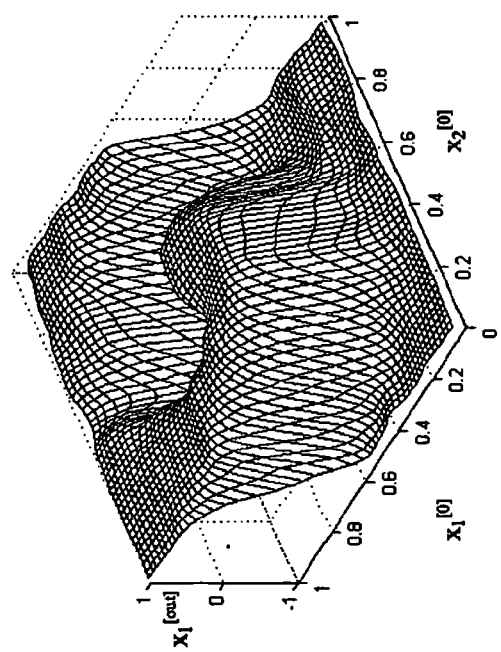
Figure 9 – Sine Network solution of the two spirals problem.
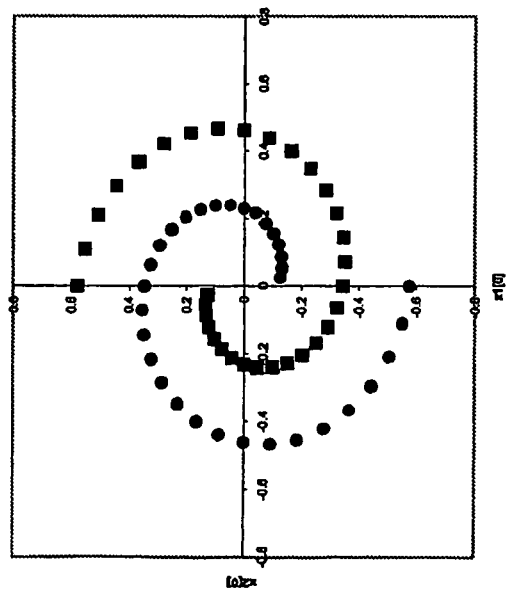
Figure 8 – The two spirals problem.

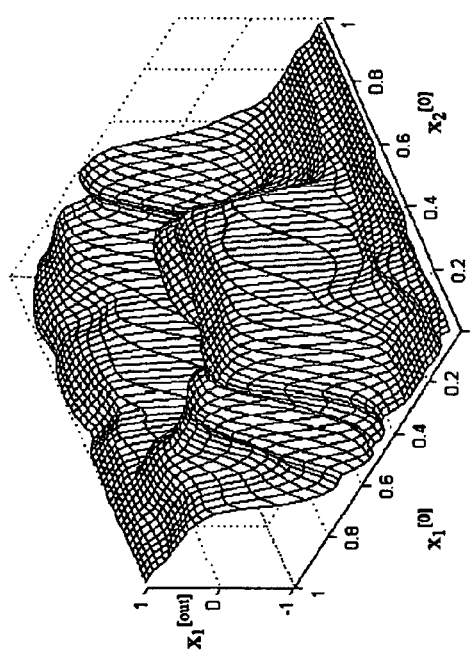
Fig. 11a — SN solution of Spiral problem with weight range (-1,1)
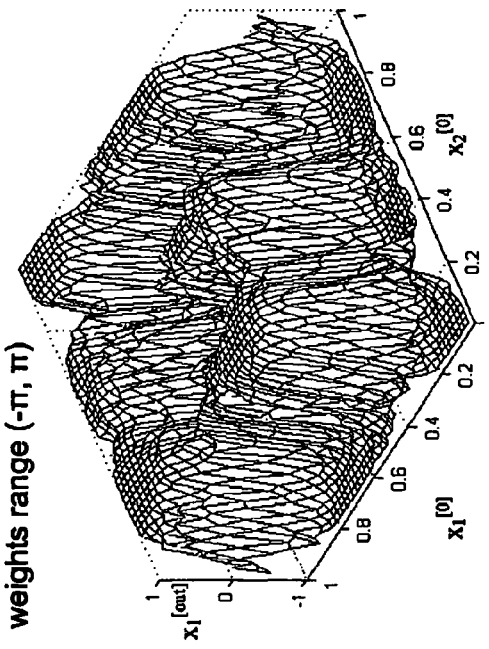
Fig. 11b — SN solution of Spiral problem with weights range (-π, π)
Figure 11c — SN solution of Spiral problem with weight range (-10,10)
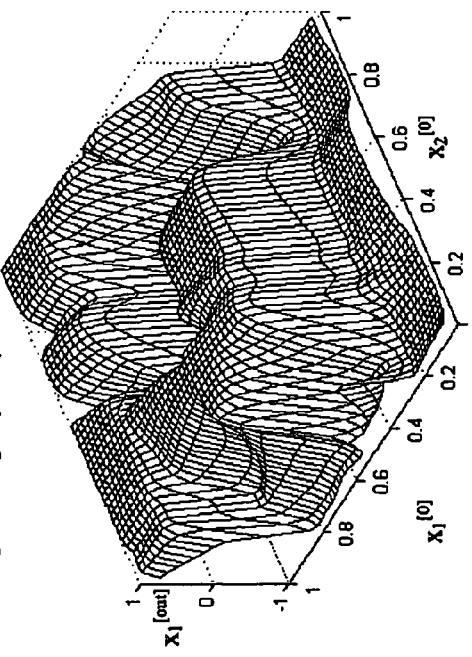
Fig. 11d — SN solution of Spiral problem with weight range (-20,20)

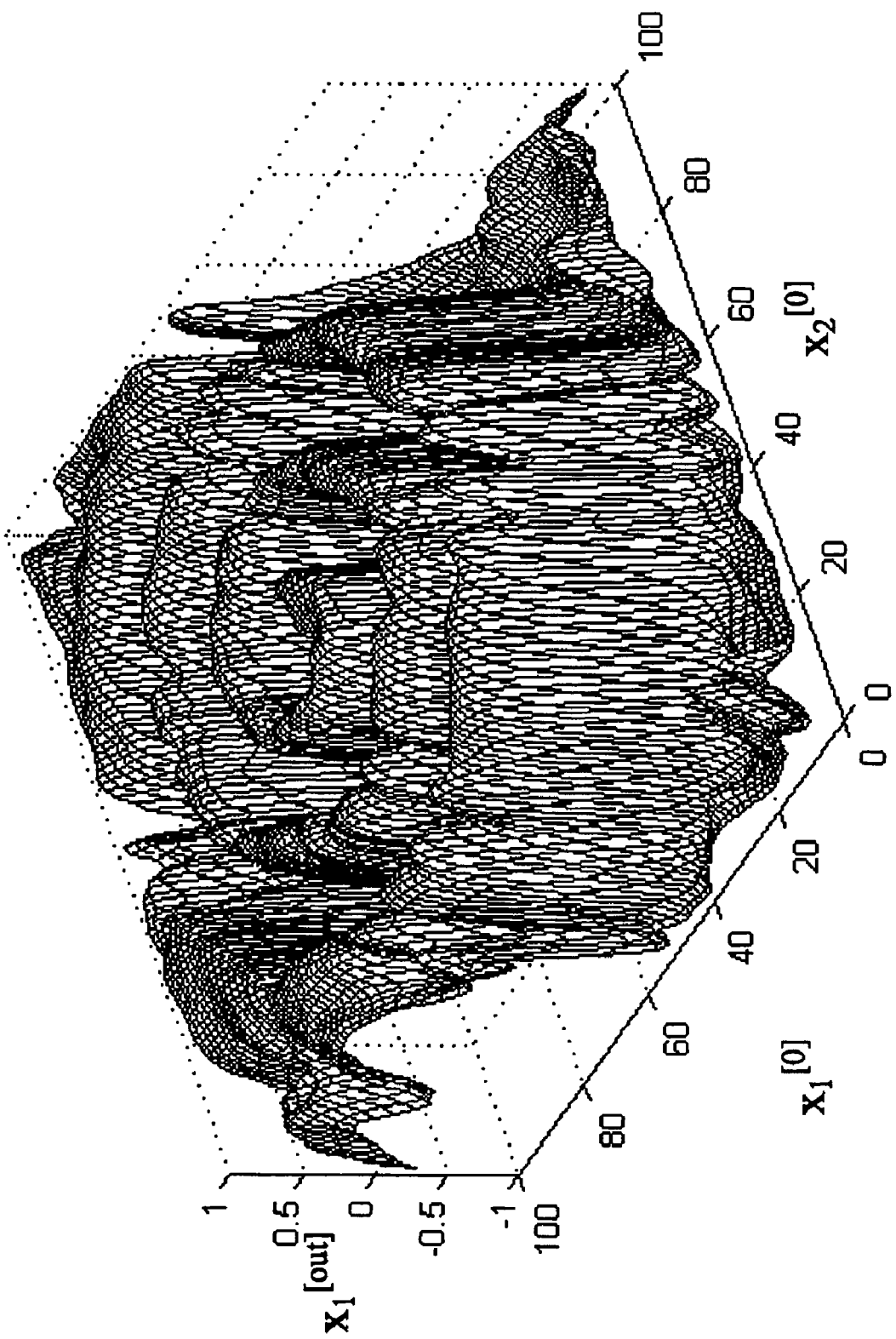
Figure 12 – Solution of Sine Net on spiral problem with 192 points.

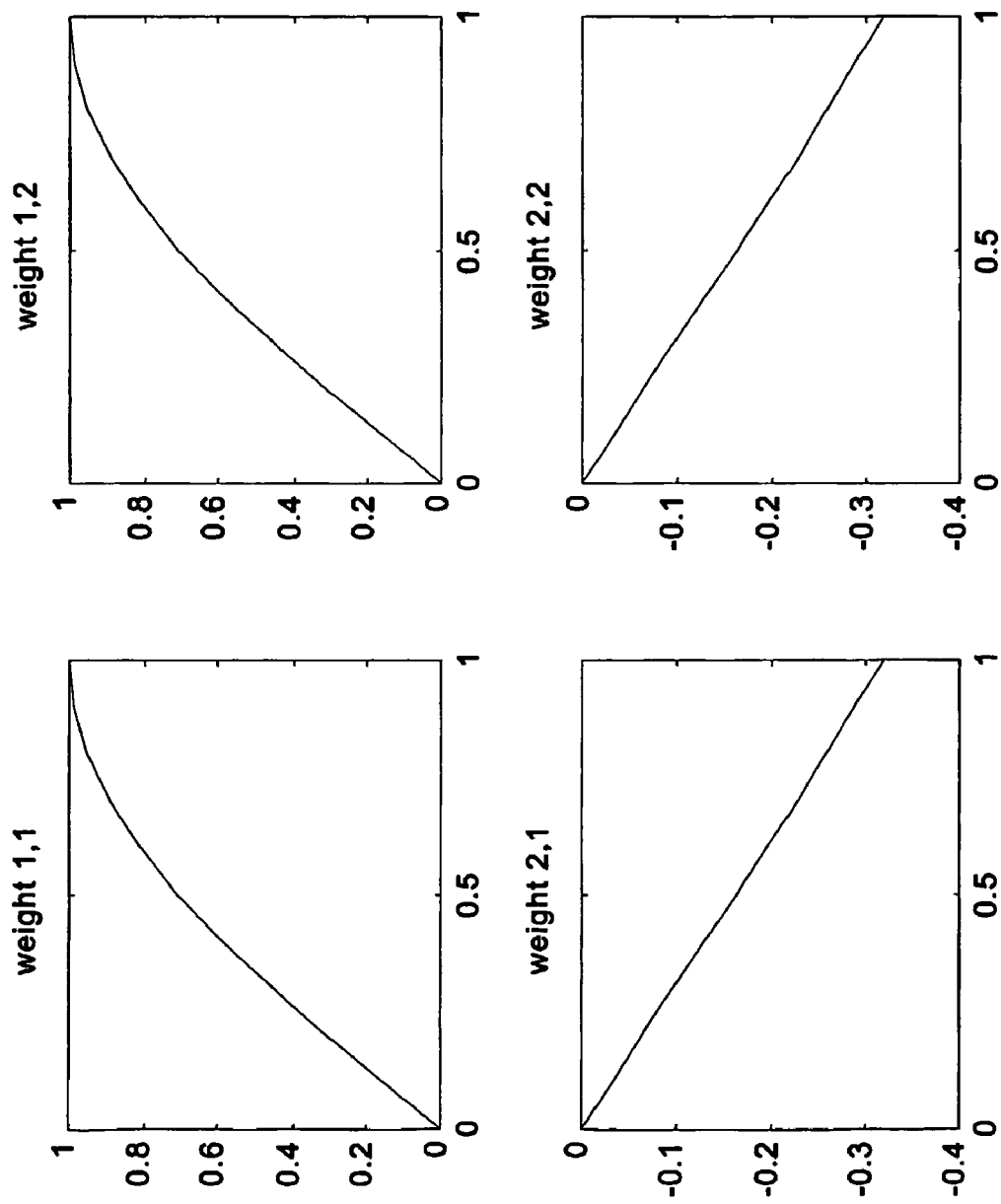
Figure 13 – SN weight transfer function from input to hidden nodes

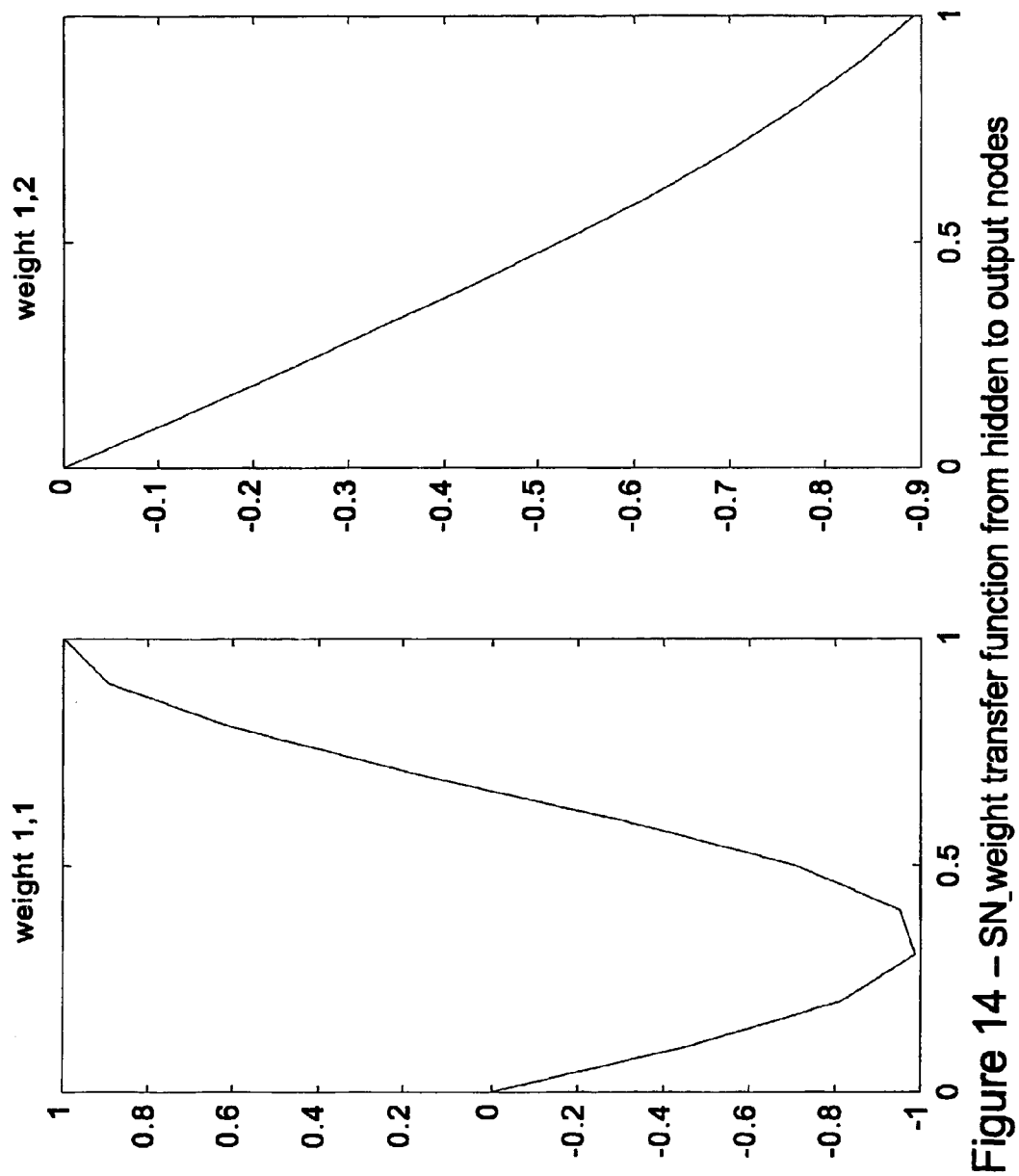
Figure 14 – SN_weight transfer function from hidden to output nodes

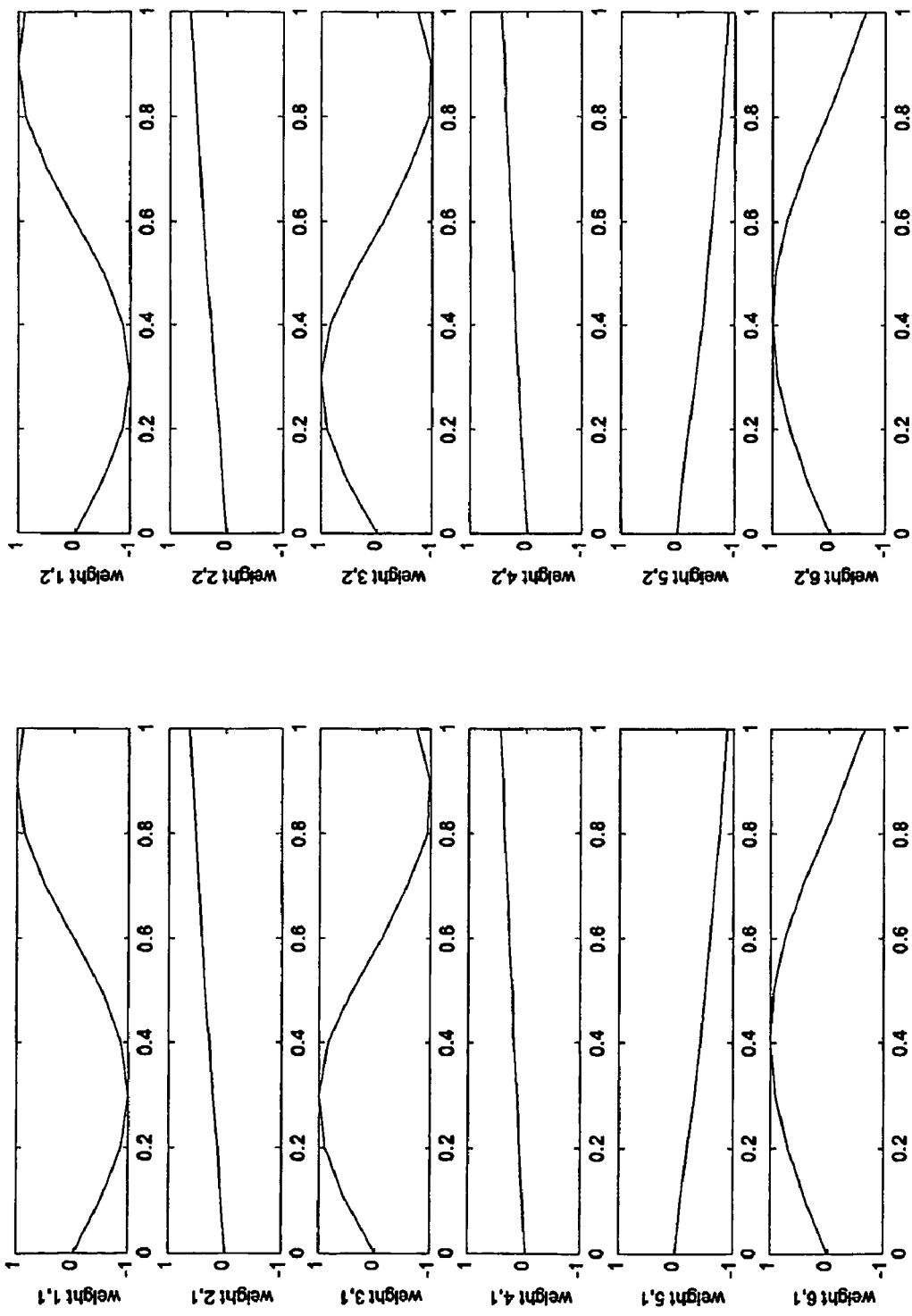
Figure 15 – SN weight transfer function from input to hidden nodes

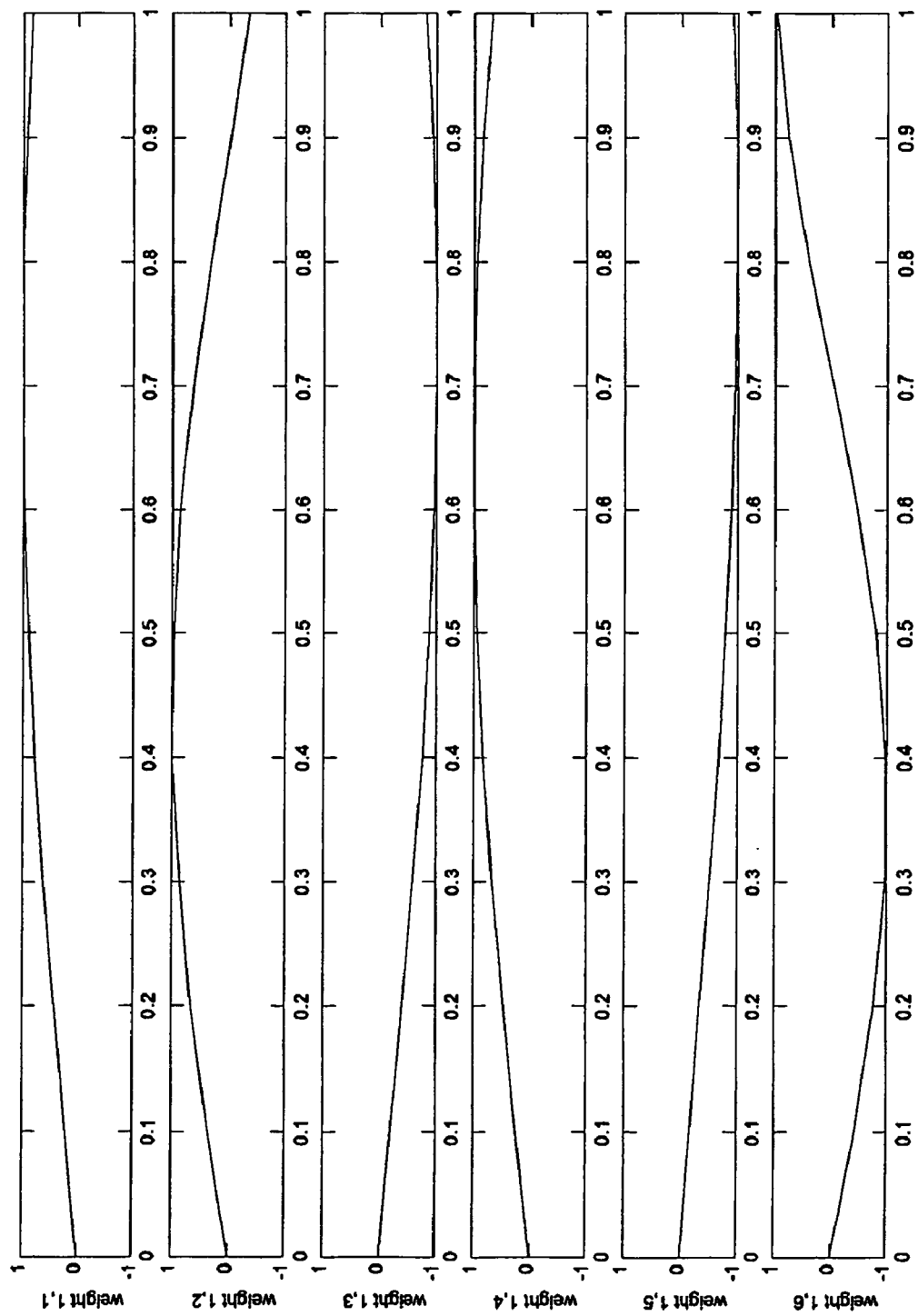
Figure 16 – SN weight transfer function from hidden to output nodes

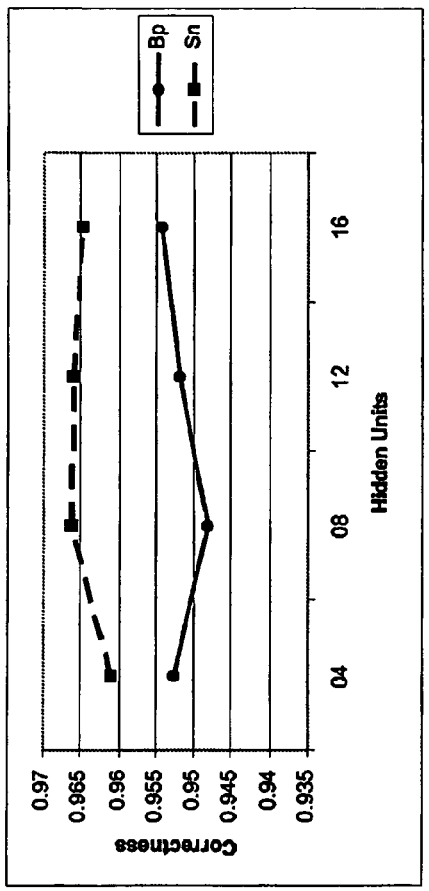
Figure 17 – Comparison between Bp and SN network during the first trial, correctness on hidden units number
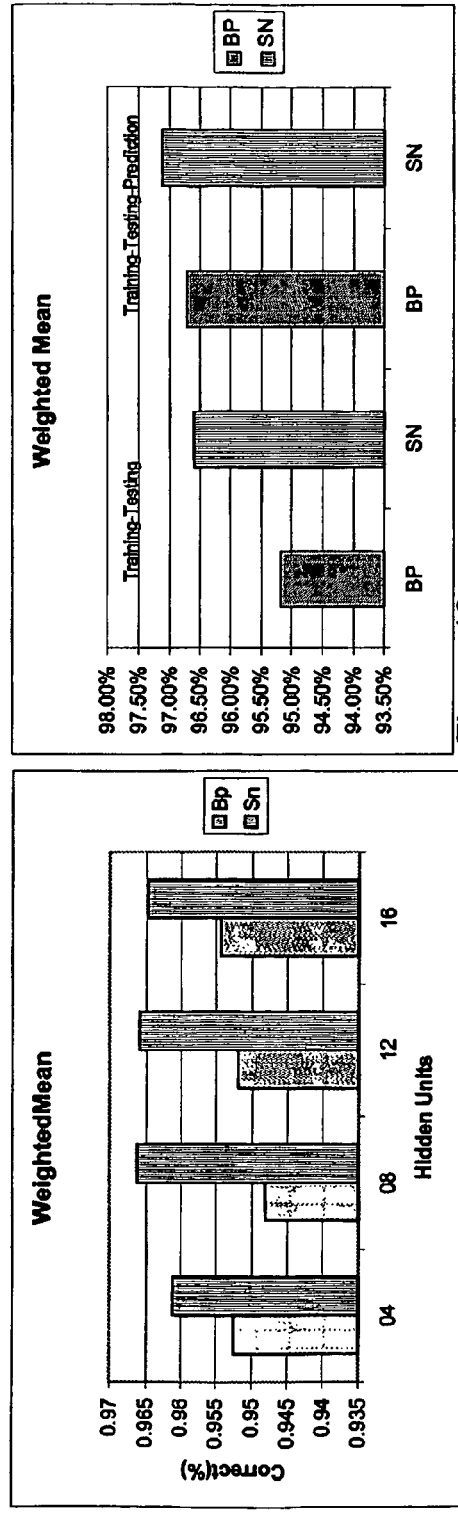
Figure 19 – Result Comparison between BP and SN on the Breast Cancer dataset using "Early Stopping"
Figure 18 – Result Comparison between BP and SN on the Breast Cancer dataset.

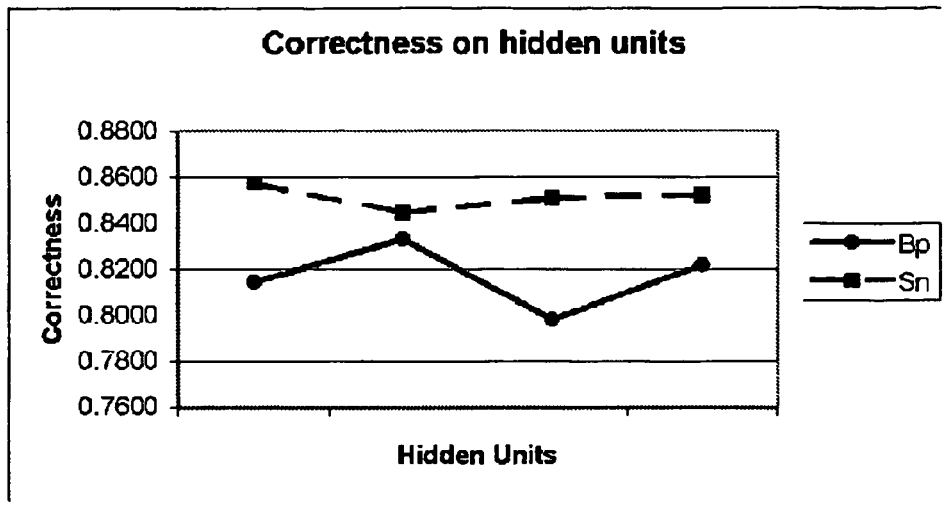
Figure 20 – Comparison between Bp and SN network during the first trial, correctness on hidden units number
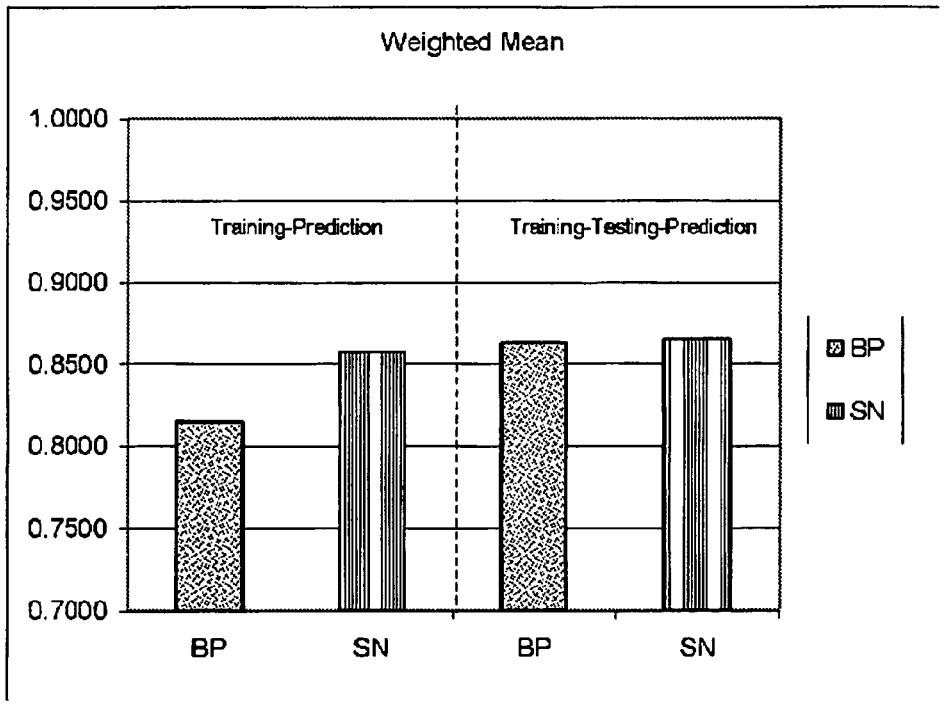
Figure 21 – Result Comparison between BP and SN on the Australian Credit Scoring dataset, with "Early Stopping" (Tr-Ts-Pr) and without (Tr-Pr)

ARTIFICIAL NEURAL NETWORK

CROSS REFERENCE TO RELATED APPLICATIONS

This application is the United States national stage filing of corresponding international application number PCT/EP2004/051891, filed on Aug. 24, 2004, which claims priority to and benefit of European Application No. 03425582.8, filed on Sep. 9, 2003, each of which is hereby incorporated herein by reference.

The invention refers to a neural network, comprising several nodes forming at least two layers a first one of which is a so called input layer and the last of which layers is a so called output layer, the input layer nodes forming inputs for entering the input data of a database and the output layer nodes forming outputs channels for furnishing output data which are the results of the elaboration of the input data, connection being provided between the nodes of the input layer and the nodes of the output layer, each node of the output layer carrying out a transformation of the input data received from the input layer into output data which transformation comprises a first transformation step comprising at least a sub-step consisting in summing the input data received from the input nodes to the said output nodes by weighting the said input data and a second transformation step which transforms non linearly the results obtained by the first transformation step the output data obtained by the said transformation carried out in an output node being the output data Artificial neural networks are widely used for different aims. Generally speaking artificial neural networks belongs to the family of so called predictive algorithm which are able to learn from data of a database in order to reach a certain initial level of experience for evaluating situations which can be described by means of the data records of a database acquired in many different ways. Thus a trained adaptive algorithm such as artificial neural networks can be employed for evaluating the consequences of certain situations defined by certain features which are represented and coded by the data or variables of the data records of a database and on the basis of the results of this evaluation a machine operating by means of these adaptive algorithms can take decisions on the applying of certain measures or actions without needing the intervention of human personal.

Adaptive algorithm does not stop learning and can collect and refine their experience by improving their knowledge any time they are used, thus adding by their use further knowledge to the one acquired during the first learning phase.

These kind of algorithm are the basis for improving the capabilities in carrying out automatically tasks without the help of human intelligence or intervention. Typically they are applied in robots or in highly intelligent systems for automatisation and allow to expand the use of machines with high reliance levels also in carrying out tasks which cannot be defined in terms of rigid data based on technical, physical, chemical parameters or the like.

From this point of view such kind of algorithm have a technical character and a technical effect, since the aim of these algorithm is to provide technical apparati, such as computers which compute data in a way similar to the way as this data would have been treated by the human brain by providing in a more simple way a structure which is conform to the known structure of the brain.

The algorithm are used in order to solve many technical problems or to provide for technical effects as for example for methods of image recognition or edge detection.

Actually many kinds of architectures for such adaptive algorithms and particularly for such artificial neural networks are known.

The general structure and principle of such artificial neural networks is described in the following by means of FIGS. 1 and 3.

In a classical network each node works as an element that receives the weighted input from the input nodes, sums them and transforms the result through a non linear function. Nodes are functional elements being able to carry out transformations of input data furnished by the database and or by other nodes and to furnish as an output, output data to be sent to other nodes or the output data of the artificial neural network.

FIG. 3 clarifies the mechanism. In the classical networks each node operates a non linear transformation on a linear transformation of its inputs:

$$x_j^{[s]} = F(L(w_{ji}^{[s]}, x_i^{[s-1]}))  \quad (1)$$

where the non linear transformation $F(\bullet)$ is a function like, for example, a sigmoid and the linear transformation $L(\bullet)$ is the weighted sum of the inputs:

$$L(w_{ji}^{[s]}, x_i^{[s-1]}) = \sum_{i=0}^{n} w_{ji}^{[s]} \cdot x_i^{[s-1]} \quad (2)$$

As a result from (1) and (2):

$$x_j^{[s]} = F\left(\sum_{i=0}^{n} w_{ji}^{[s]} \cdot x_i^{[s-1]}\right) \quad (3)$$

where

[s]: the generic layer of the network, with s=1 for the input layer and increasing values for the hidden and output layers;

$x_j^{[s]}$: the output variable of the j-th node in layer [s];

$x_i^{[s-1]}$: the i-th input to the generic node in layer [s] from the i-th node in layer [s-1];

$x_0^{[s-1]}$: a "false" input to the generic node in layer [s], artificially introduced to represent, in a mathematically convenient way, a useful threshold value. Its value is usually fixed to 1.

$w_{ji}^{[s]}$: the weight on the connection joining the i-th node in layer [s-1] to the j-th node in layer [s];

n: the number of input to the node.

Furthermore it is well known that artificial neural networks can have more than the two layers namely the input and the output layer which layers are provided intermediate to the input and the output layers and are called hidden layers. An artificial neural network can have more than one hidden layer. Each node of each layer may be connected by a communication channel with one or more or with each node of the following layer which can be a hidden layer or the output layer. Each node carries out the above mentioned transformations on the input received by the other nodes of the preceding layer and furnishes to the nodes of the following layer an output value which is calculated by the above mentioned transformation of the input received by the nodes of the previous layer. Many kinds of architecture of connection between nodes of the different or of the same layer are known and used and the present invention is not limited to anyone of the said known architectures since any of the known architectures of neural networks can be modified according to the teaching of the present invention.

It is an important aim for artificial neural networks to improve their reliance and their capability of rapidly converging to a high precisely solution of the problem treated i.e. to a high precise evaluation of the situation depicted by the input data and thus to a high reliable output data or prediction.

The functions described above comprises parameters which are normally randomly set to certain initialization values and the learning phase of the algorithm consists in feeding to the algorithm known input data and the corresponding known output data. During this learning phase the parameters, usually the weights applied to the received input data by the first transformation step are corrected in order to obtain a best fit of the input data with the corresponding output data known from the records of the learning dataset.

Different kind of sets of learning functions are known for teaching the algorithm are known. These sets of learning functions are a critical feature of the algorithm since the learning phase influences the computational reliance and the computational speed of the algorithm and thus the functionality of the algorithm. The weights are defined by means of reducing the gap between computed outputs and known outputs for the same input data. Depending on the structure of the data often during minimization of the error the algorithm detects only local minima and not the absolute minima so that it sticks at these local minima without being able to detect the absolute minima coinciding with the best trained or learned algorithm.

For a complete description of different kinds of artificial neural networks see for example Arbib M. A., (Ed.), (1995a), *The Handbook of Brain Theory and Neural Networks*, A Bradford Book, The MIT Press, Cambridge, Mass., London, England, 1995.

Buscema M. & Semeion Group (1999a), *Reti Neurali Artificiali e Sistemi Sociali Complessi, Vol. I: Teoria e Modelli*, Franco Angeli, Milano, 1999.

Document JP 20022366927 discloses a neural network capable of learning a time series characteristic. This neural network has five layers comprising an input layer, an output layer and three intermediate hidden layers. Input vectors are subjected to a non linear combination transformation of their respective elements before being fed to the nodes of the input layer. No non linear transformation sub-step is carried out at the inputs of the hidden and output layers. The non linear combination of the elements of the input vector do not consist in an optimization of the learning function of the neural network and do not have the effect of avoiding sticking in local minima. This derives clearly from the fact that the knots of the hidden layers and the output layer do not carry out the non linear pre-processing so that the optimization of the learning process does not take place.

Document EP 621549 discloses a non linear operation unit and data processing apparatus using the non linear operation unit in which the non linear operation unit includes non linear function operation means for receiving at least one input signal and performing the computing operation of the input signal by using a non linear function, multiplying means for multiplying the function value as the result of the computing operation by the non linear function operation means by a weight value and adder means for adding together the results of the multiplying operations by the multiplying means and adding a threshold value to the sum. This operation units forms the knots of a neural network which are arranged in layers and are connected one to the other. The non linear operation carried out on the input signals to each knot is nothing else than the usual non linear operation which in conventional neural networks is carried out on the weighted summation signal of the inputs of the operation unit. This inversion of the sequence of linear summation and weighting step and of non linear transformation has only the meaning of taking into account and avoiding errors due to non linear behaviours of the multiplying and summation means due to systematic drifts as for examples thermal offsets or other effects. The said non linear behaviour is minimized by carrying out the traditional second step non linear transformation as a first transformation step and the traditionally first linear transformation step consisting in the weighting of the inputs and summation of the inputs as the second transformation step. The operation units according to the disclosure of EP 621549 does not have a further effect on the learning behaviour or on avoiding local minima than in the traditional neural networks. The only effect achieved is the taking into account and the overcoming of computational systematic or occasional non linear noise introduced by the real functioning of the linear summation and multiplying means.

The invention has the aim of improving an artificial neural network in such a way as to have better, more reliable and faster convergence of the algorithm to the best solution and avoiding also local minima during learning phase.

The invention achieves the above mentioned aims by means of an artificial neural network as describe at the beginning further comprising the feature that in each output node the first transformation step comprises two sub-steps a first sub-step being a non linear transformation function of the input data received by the output nodes from the input nodes and the second sub-step being the summing step of the said non linearly transformed input data in the said first sub-step.

Generally an artificial neural network comprises an input layer having a predetermined number of input nodes and an output layer having a predetermined number of output nodes and between the said input and the said output layer there is provided at least one further layer of nodes, so called hidden layer, or more than one hidden layers. The nodes of this hidden layer being connected by weighted connection to the input nodes of the input layer and to the nodes of a further hidden layer when more than one hidden layer is provided or to the output nodes of the output layer if only one hidden layer is provided, each node of the at least one hidden layer or of the more than one hidden layers. The nodes of the output layer carrying out a transformation of the input data received from the input layer or from a preceding hidden layer into output data which transformation comprises a first transformation step consisting in two subsequent sub-steps, a first sub-step consisting in a non linear transformation function of the input data received by the output nodes or by the nodes of a hidden layer from the input nodes of the input layer or by the nodes of the preceding hidden layer and the second sub-step consisting in summing the said input data being non linearly transformed in the said first sub-step by further weighting the said non linearly transformed input data and a further second transformation step being carried out which transforms non linearly the results obtained by the first transformation step, the output data obtained by the said transformation carried out in the said nodes being the output data if the nodes are the output nodes of the output layer or the input data furnished from the nodes of a hidden layer to the nodes of a following hidden layer or to the output nodes of the output layer.

The input data of the nodes of the input layer consist in the input data of the database, while the output data of the nodes of the input layer are furnished to the nodes of the output layer or to the nodes of the first hidden layer or to the at least one hidden layer as input data of the nodes of these layers and the output data of the output layer consist in the elaboration result of the artificial neural network.

The first non linear transformation of the input data carried out by a node comprises a first transformation sub-step of the input data by means of a sinusoidal function and a second transformation sub-step consisting in the sum of the input data after transformation by the sinusoidal function, i.e. after having carried out the first transformation sub-step.

Each node at least of the at least one hidden layer and of the output layer can be described as comprising several input channels for different input data;

to each channel being associated a receiver unit for carrying out the first non linear transformation sub-step of the first transformation step;

a summation unit being further provided having an input connected to the outputs of the receiver unit of each channel and for carrying out the second transformation sub-step of the first transformation step by summing the non linearly transformed input data of each channel to a value and a non linear transformation unit having an input connected to an output of the summation unit for carrying out the second transformation step by non linear filtering of the value obtained by the first transformation step and furnishing the output value of the node which is the input value of the nodes of a following hidden or of the output layer.

Input data further can consist in a predetermined number of variables in an input data variable space defining coordinates in the input data space and each coordinate in the input data space is non linearly transformed in the first transformation step in a corresponding variable value which is made dependent by the spatial position of the coordinate value with respect a spatial wave of given wavelength, this dependence consisting in multiplying the input coordinate values, by the wavelength of a sinusoidal wave which are then transformed into the same value, the wavelength on each input coordinate being tuned during the learning phase.

The transformation of the input data carried out by each nodes is defined by the following equation $$x_j^{[s]} = F(G(w_{ji}^{[s]}, x_i^{[s-1]}))  \qquad (4)$$

where the non linear transformation $F(\bullet)$ is the non linear filtering function of the second transformation step and $G(\bullet)$ is the non linear transformation function of the first transformation step consisting the sum of the non-monotonically, sinusoidal processed weighted inputs according to the following function:

$$G(w_{ji}^{[s]}, x_i^{[s-1]}) = \sum_{i=0}^{n} \sin(w_{ji}^{[s]} \cdot x_i^{[s-1]})  \qquad (5)$$

where

[S]: the generic layer of the network, with s=1 for the input layer and increasing values for the hidden and output layers;

$x_j^{[s]}$: the output variable of the j-th node in layer [S];

$x_i^{[s-1]}$: the i-th input to the generic node in layer [S] from the i-th node in layer [s-1];

$x_0^{[s-1]}$: a "false" input to the generic node in layer [S], artificially introduced to represent, in a mathematically convenient way, a useful threshold value which is usually fixed to 1.

$w_{ji}^{[s]}$: the weight on the connection joining the i-th node in layer [s-1] to the j-th node in layer [S];

n: the number of input to the node.

Each node carries out a transformation of the input data according to the following function:

$$x_j^{[s]} = F\left(\sum_{i=0}^{n} \sin(w_{ji}^{[s]} \cdot x_i^{[s-1]})\right)  \qquad (6)$$

The sine function introducing a qualitative process as each weight $w_{ji}^{[s]}$ plays as a $2\pi$/wavelength parameter in the i-th coordinate of the input space of the j-th node of the s-th layer.

The second non linear transformation step can be carried out by means of a sigmoid function.

Also the input nodes of the input layer can carry out a first non linear transformation step and a second non linear transformation step of the input data received by being provided with the following units:

a receiving channel for input data a receiver unit associated to the said receiving channel for carrying out the first non linear transformation sub-step of the first transformation step as defined in the previous claims;

a summation unit for carrying out the second transformation sub-step of the first transformation step by summing the non linearly transformed input data of each channel to a value as defined in the previous claims;

and a non linear transformation unit for carrying out the second transformation step by non linear filtering of the value obtained by the first transformation step as defined by the previous step and furnishing the output value of the input nodes node which is the input value of the nodes of a following hidden or of the output layer.

The presence of a specific double non-linear relationship on the connections between nodes has some evident consequences on the properties of the network according to the present invention both on the computed function and on the behaviour of this network during the learning phase.

The processing according to the present invention can be applied to existing networks topologies as a fundamental modification of their learning equations representing a new general learning law. The new learning law demonstrates a considerable convergence and a high extrapolation capabilities on complex data bases.

Further improvements of the present invention are disclosed in the depending claims.

The features of the algorithm according to the present invention and the advantages obtained therewith will be describe more clearly by means of detailed examples and of the enclosed drawings in which:

FIG. 1 illustrates a schematic view of the conceptual processing in classical networks.

FIG. 2 illustrates in an analogous way as FIG. 1 the conceptual processing according to the networks of the present invention.

FIG. 3 illustrates schematically the node variables for the j-th node.

FIG. 4 illustrates schematically the structure of a multi-layer network according to the invention.

FIGS. 5 to 7 illustrates a diagram of the solution of the XOR problem by means of a classical back propagation neural network, of a so called RBF network and by means of the neural network according to the present invention.

FIG. 8 illustrate a diagram of the so called two spiral problem.

FIGS. 9 and 10 are diagrams representing the solution of the two spiral problem obtained respectively with the neural network according to the present invention and with a classical back propagation neural network.

FIGS. 11*a* to 11*d* are diagrams illustrating different solution of the two spiral problem obtained by the neural network according to the present invention with different ranges.

FIG. 12 is a diagram of the solution of the two spiral problem obtained by the network according to the present invention on 192 input points.

FIG. 13 illustrates the diagrams of the weight transfer function from input to hidden nodes in a network according to the present invention.

FIG. 14 illustrates the diagram of the weight transfer function from hidden to output nodes in a network according to the present invention.

FIG. 15 illustrates further diagrams of the weight transfer function from input to hidden nodes in a network according to the present invention FIG. 16 illustrates further diagrams of the weight transfer function from hidden to output nodes in a network according to the present invention.

FIG. 17 is a diagram illustrating the comparison between a classic Back propagation neural network and the neural network according to the present invention during the first trial, correctness on hidden units number.

FIG. 18 is a diagram representing the result of the comparison between a classic Back propagation neural network and the neural network according to the present invention on the Breast Cancer dataset.

FIG. 19 is a diagram representing the result of the comparison between a classic Back propagation neural network and the neural network according to the present invention on the Breast Cancer dataset using "Early Stopping".

FIG. 20 is a diagram representing the comparison between a classic Back propagation neural network and the neural network according to the present invention during the first trial, correctness on hidden units number with reference to the example related to the Australian Credit Scoring dataset.

FIG. 21 is a diagram representing the result of the comparison between a classic Back propagation neural network and the neural network according to the present invention on the Australian Credit Scoring dataset, with "Early Stopping" (Tr-Ts-Pr) and without (Tr-Pr)

The example illustrated in the figures and used for the tests relates to a multilayer neural network having more than one hidden layer interposed between the input layer and the output layer (FIG. 4) Data of the database are furnished to the nodes of the input layer which have channels for receiving this input data. Each node of the input layer is connected to each of the nodes of a first hidden layer. Each node of the first hidden layer is connected to each node of a further hidden layer an so on till to a last hidden layer each nodes of which are connected to each of the nodes of the output layer.

As it will appear more clearly in the following theoretical description and from FIGS. 1 to 3, the nodes of a neural network are processing units which receive input data at one, two, three or more input channels and which carry out a transformation of the input data according to a non linear function for furnishing at an output channel a value which is the output data computed by the neural network if the nodes are the ones of the output layer or which output values are furnished as input data to the nodes of a following layer such as a hidden layer or as an output layer.

Typically the transformation of the input data received by a node is carried out according to two steps. A first transformation step for computing the net input to the node, which is normally a sort of weighted or averaged sum of the input data received by a node and a second transformation step which is a non linear filtering of the input data transformed according to the first step.

FIG. 1 illustrates a typical classic and known node according to the state of the art. The single variables of the functions are explained in FIG. 3.

According to FIG. 3, for a typical node in a certain layer of an artificial neural network following variables are used the meaning of which is explained in the following:

[s] is defined as the number of the generic layer of the network, with s=1 for the input layer and increasing values for the hidden and output layers;

$x_j^{[s]}$ indicates the output variable of the j-th node in layer [s];

$x_i^{[s-1]}$ indicates the i-th input to the generic node in layer [s] from the i-th node in layer [s−1];

$x_0^{[s-1]}$ indicates a "false" input to the generic node in layer [s], artificially introduced to represent, in a mathematically convenient way, a useful threshold value. Its value is usually fixed to 1.

$w_{ji}^{[s]}$ indicates the weight on the connection joining the i-th node in layer [s−1] to the j-th node in layer [s];

n indicates the number of input to the node.

In a classical network each node works as an element that receives the weighted input from the input nodes, sums them and transforms the result through a non linear function. Thus in the classical networks each node operates a non linear transformation on a linear transformation of its inputs according to the following function:

$$x_j^{[s]}=F(L(w_{ji}^{[s]}, x_i^{[s-1]})) \qquad (1)$$

where the non linear transformation F(•) is a function like, for example, a sigmoid and the linear transformation L(•) is the weighted sum of the inputs:

$$L(w_{ji}^{[s]}, x_i^{[s-1]}) = \sum_{i=0}^{n} w_{ji}^{[s]} \cdot x_i^{[s-1]} \qquad (2)$$

As a result from (1) and (2) the classical transformation function of a generic node in a classic neural network is obtained:

$$x_j^{[s]} = F\left(\sum_{i=0}^{n} w_{ji}^{[s]} \cdot x_i^{[s-1]}\right) \qquad (3)$$

FIG. 2 illustrates schematically the structure of a generic node in an artificial neural network according to the present invention.

R designates functional receiving units performing a first input transformation sub step of the first transformation step on each input channel of the node. The first input transformation sub step is a non linear transformation which will be explained in greater detail in the following description.

Σ designate the second input transformation sub step of the first transformation step carrying out the sum of the weighted inputs values which has been previously transformed by a non linear function in the receiving units R.

$X_i$ to $X_n$ indicate the input values which are received by the node form other nodes i to n if the node belongs to a hidden layer or to the output layer or which are the input data of the database if the node belongs to the input layer.

$w_i$ to $w_n$ indicates the weight applied to each connection along which the node receives the input values from the other nodes.

F indicate a further unit of the node in which a non linear transformation step is carried out on the input values which have been subjected to the first transformation step and furnishes so an output value of the node indicated by Y.

Being the node illustrated a node of the input layer or of a hidden layer the output value is transmitted via the weighted connection to each one or to a certain number of nodes of a following layer which can be hidden layer or the output layer while if the illustrated node is the node of the output layer, Y indicates the contribution of the node to the computed output data by the network.

The basic idea in the processing of data according to the artificial neural network of the present invention is to provide each node with the receiver units R interposed between each input and the summation unit E. The receiver units R appropriately transform in a non linear way the input received by a node from each input node, before summing the input contributes into a value to be transformed through a non linear function which is the function applied by the second step transformation unit F. The meaning of the receiver units R is the introduction of a quanti-qualitative process on the input value, in substitution of a merely quantitative process on it, in analogy to what is done in biological organisms by chemical ports with respect to potential ports. The qualitative aspects of transformation is obtained by using sinusoidal functions. For each i-th coordinate of the input space, this allows the introduction of a dependency of each i-th transformed value by the spatial position of the coordinate value with respect to a spatial wave of given wavelength. Input coordinate values, multiplied by the wavelength, are then transformed into the same value. The wavelength on each input receiver is tuned during the learning phase of the artificial neural network as it will be evident in the following description of an embodiment.

In the artificial neural network according to the present invention each node operates a non linear transformation on a non linear transformation of its inputs. The function describing this transformation is indicated below by considering the variable terminology defined above with reference to FIG. 3:

$$x_j^{[s]} = F(G(w_{ji}^{[s]}, x_i^{[s-1]})) \quad (4)$$

Here the non linear transformation F(•) is again a function like, for example, a sigmoid and G(•) is also a non linear transformation which can be defined as the sum of the non-monotonically, sinusoidal processed weighted inputs:

$$G(w_{ji}^{[s]}, x_i^{[s-1]}) = \sum_{i=0}^{n} \sin(w_{ji}^{[s]} \cdot x_i^{[s-1]}) \quad (5)$$

As a result from (4) and (5) the transformation operated on the input by a node in an artificial neural network according to the present invention is described by the following function:

$$x_j^{[s]} = F\left(\sum_{i=0}^{n} \sin(w_{ji}^{[s]} \cdot x_i^{[s-1]})\right) \quad (6)$$

The sine function introduces the qualitative process desired. It can be noted as each weight $w_{ji}^{[s]}$ plays as a $2\pi$/wavelength parameter in the i-th coordinate of the input space of the j-th node of the s-th layer.

It has furthermore to be noted that as already stated above ad as it appears clearly from the above description, the family of networks according to the present invention consists of quite generally defined networks, deeply modified in the inner behaviour of their nodes. This adjustment of the nodes is taken into account, both in the output evaluation from input and in the learning phases.

In the following an example of an artificial neural network according to the present invention in combination with a well known structure of neural network so called Back propagation is described with greater detail.

The artificial neural network has a multilayer structure as describe in FIG. 4.

The back propagation neural networks operate according to a well known principle so called Gradient Descent Principle (for deeper detail see Rumelhart D. E., Hinton G. E., and Williams R. J., (1986), "Learning internal representations by error propagation", in Rumelhart D. E. and McClelland J. L., eds. (1986), *Parallel Distributed Processing: Explorations in the Microstructure of Cognition*, Volume 1, 318-362, Cambridge, Mass.: The MIT Press. 1986)

As an example of an artificial neural network according to the present invention the neural network describe applies a gradient descent principle modified with the node's processing according to the present invention and the equations governing the neural network will be analyzed in detail as a direct applications of the node's processing defined in equation (5). This equations are presented in two groups: the equations for the signal transfer from input to output (forward phase equations) and the equations for the learning phase (learning phase equations).

The following equations refer to the generic case of a gradient descent with multiple hidden layers modified according to the invention. In FIG. 4, a multilayer network with two hidden layers is represented. It can be noted that the presence of the receiving units executing the first non linear sub step of the first transformation step on the inputs are provided only at the hidden and output nodes.

Forward Phase Equations

As stated in equation (5), for the generic (s) layer, a so called harmonic net input is defined by means the equation:

$$I_j^{[s]} = \frac{2\pi}{n} \sum_{i=0}^{n} \sin(w_{ji}^{[s]} \cdot x_i^{[s-1]}) \quad (7)$$

The activation value in output is calculated according to the equation:

$$x_j^{[s]} = f(I_j^{[s]}) = f\left(\frac{2\pi}{n} \sum_i \sin(w_{ji}^{[s]} \cdot x_i^{[s-1]})\right) \quad (8)$$

where, for the activation function $f(I_j^{[s]})$, the usual transformations can be used, as for instance, the sigmoidal:

$$x_j^{[s]} = sigm(I_j^{[s]}) = \frac{1}{1+e^{-I_j^{[s]}}} \qquad (9)$$

Learning Phase Equations

The gradient descent principle is used:

$$\Delta w_{ji}^{[s]} = -lcoef \cdot \frac{\partial E}{\partial w_{ji}^{[s]}} \qquad (10)$$

with usual Global Error functions, as for instance, the Mean Square Error:

$$E = \frac{1}{2} \cdot \sum_{k=1}^{m}(t_k - x_k^{[out]})^2 \qquad (11)$$

In order to evaluate the error on each node a local error is defined, according to the equation:

$$e_j^{[s]} = -\frac{\partial E}{\partial I_j^{[s]}} \qquad (12)$$

From above it follows:

$$\Delta w_{ji}^{[s]} = -lcoef \cdot \frac{\partial E}{\partial w_{ji}^{[s]}} = \qquad (13)$$

$$= -lcoef \cdot \frac{\partial E}{\partial I_j^{[s]}} \cdot \frac{\partial I_j^{[s]}}{\partial w_{ji}^{[s]}} =$$

$$= lcoef \cdot e_j^{[s]} \cdot \frac{\partial}{\partial w_{ji}^{[s]}}\left(\frac{2\pi}{n}\sum_k \sin(w_{jk}^{[s]} \cdot x_k^{[s-1]})\right) =$$

$$= lcoef \cdot e_j^{[s]} \cdot \frac{2\pi}{n} x_i^{[s-1]} \cdot \cos \cdot \cos(w_{ji}^{[s]} \cdot x_i^{[s-1]})$$

To determine the weights correction value, it is necessary to calculate the local error $e_j^{[s]}$.

For the output layer:

$$e_j^{[out]} = -\frac{\partial E}{\partial I_j^{[out]}} = \qquad (14)$$

$$= -\frac{\partial E}{\partial x_j^{[out]}} \cdot \frac{\partial x_j^{[out]}}{\partial I_j^{[out]}} =$$

$$= -\left(\frac{\partial}{\partial I_j^{[out]}}f(I_j^{[out]})\right) \cdot \left(\frac{\partial}{\partial x_j^{[out]}}\left(\frac{1}{2}\sum_{k=1}^{m}(t_k - x_k^{[out]})^2\right)\right) =$$

$$= f'(I_j^{[out]}) \cdot (t_j - x_j^{[out]})$$

For the other layers:

$$e_j^{[s]} = -\frac{\partial E}{\partial I_j^{[s]}} = \qquad (15)$$

$$= -\frac{\partial E}{\partial x_j^{[s]}} \cdot \frac{\partial x_j^{[s]}}{\partial I_j^{[s]}} =$$

$$= -f'(I_j^{[s]}) \cdot \sum_k \left(\frac{\partial E}{\partial I_k^{[s+1]}} \cdot \frac{\partial I_k^{[s+1]}}{\partial x_j^{[s]}}\right) =$$

$$= -f'(I_j^{[s]}) \cdot \sum_k \left(-e_k^{[s+1]} \cdot \frac{\partial}{\partial x_j^{[s]}}\left(\frac{2\pi}{n}\sum_h (\sin(w_{kh}^{[s+1]} \cdot x_h^{[s]}))\right)\right) =$$

$$= f'(I_j^{[s]}) \cdot \frac{2\pi}{n}\sum_k (e_k^{[s+1]} \cdot w_{kj}^{[s+1]} \cdot \cos(w_{kj}^{[s+1]} \cdot x_j^{[s]}))$$

In the following the above defined artificial neural network is applied for solving some typical testing problems for neural networks and the results obtained are compared to the classic back propagation neural network according to the state of the art.

As a first example a very simple problem (so called toy problem) is solved by the artificial neural network according to the invention, so to enhance some basic properties and differences from the other algorithms.

This first example is a well known simple dataset known as the XOR problem. The model has to learn the XOR Boolean rule represented in the following table 1

| $x_1$ | $x_2$ | y |
|---|---|---|
| 0 | 0 | 0 |
| 0 | 1 | 1 |
| 1 | 0 | 1 |
| 1 | 1 | 0 |

A comparison is made of the results obtained by the artificial neural network according to the present invention by a so called MLP network trained with a Back-propagation algorithm. The MLP network used in this test is an enhanced version of classical Back-propagation algorithm developed at the Semeion Research Centre and described in Buscema M. and Sacco P. L. (2000) "Feedforward networks in financial predictions: the future that modifies the present", in *Expert Systems*, Vol. 17(3), Agosto, Blackwell, Oxford UK. Pp.149-170. 2000.

Obviously both networks are able to converge to the right solution, so what has been analyzed is the quality of the solution and the speed of convergence.

FIG. 5 illustrate the typical solution of the back propagation network, with two hyper planes dividing the space in three regions. It's clear the strong difference between the typical solution founded by the network according to the present invention illustrated in FIG. 7 and the solution of FIG. 5. The architecture of the artificial neural network according to the invention presents a localization property similar to some "clustering input" neural architecture as the RBF network (FIG. 6). This property is due to the non monotonic function of the connections between the input and the hidden layer.

About the speed of convergence from table 2 it appears evident that the artificial neural network according to the invention has a good performance with respect to the Back propagation neural network. This is probably in part accounted by the "clustering phase" performed by the non-linear and non monotonic weights.

|  | BP | SN |
| --- | --- | --- |
| MEAN | 94.47059 | 50.61111 |
| STDEV | 109.3281 | 67.78612 |

The comparison of table 2 is about speed of convergence on Xor problem in epochs, with 20 trials, both networks being stopped twice before convergence (local minimum).

The second simple problem with which the network according to the present invention was tested is the so called "spiral problem" the database of it is graphically illustrated in FIG. 8.

The database was submitted to computation with a Back Propapagtion network with 100 hidden units and a network according to the invention with 30 hidden units. Also in this experiment the quality of solution and the convergence speed have been evaluated.

This time there is a similar separation, with the solution of the neural network according to the invention presenting a more smoothed solution compared to the space separation obtained in the solution computed by the classic Back Propagation network.

FIG. 9 illustrate graphically the solution of the two spirals problem computed with the network according to the present invention.

FIG. 10 illustrate graphically the solution of the two spirals problem computed with the classical Back-propagation network.

During this trial an interesting property of algorithm according to the present invention has been noticed with regard to his weights initialization range. As it appears evident from FIGS. 11a to 11d, there is an increasing roughness of spiral problem solution in front of an increased range of weights initialization, as well as also a faster convergence. This means that it is possible to control the trade off between approximation and generalization properties of network according to the present invention by using different ranges for weights initialization.

In FIG. 11a the network according to the invention has been trained for about 5000 epochs with a random initialization range among (−1:+1). An RMSE value on training set of about 0.201 and a smooth separation between the two spirals is obtained. Increasing the said initialization range of the weights to a (−π: π) range (FIG. 11b) the same RMSE value is obtained at 3000 epochs and the smoothness of the solution is still suitable, instead when using a range of (−10:10) and over, only some shadow of the original problem appears, getting at the end a point by point interpolation of the training set.

Thus it is possible to say that using a network according to the present invention there is available a sensible parameter to select the interpolation/generalization properties of the trained model. This could be useful, but have some drawbacks if there is no method to decide the right range to use. It seems that here an historical problem in neural network literature has been met, particularly on Back-propagation algorithms, to define the right number of hidden units (sees Geman, S., Bienenstock E. and Doursat R., (1992), "*Neural Networks and the Bias/Variance Dilemma*", Neural Computation, 4, 1-58, 1992).

On the contrary as for the hidden units number, here there is an "almost always true" recipe for this value and it's the range (−π: π), which is clearly a full sine period. Since input is normalized between 0 and 1, this choice leads to the best results in all the experiments reported here and in others that confirm results presented in this disclosure.

Another spiral discrimination problem is the spiral with 192 points. This is an harder problem than the former one. The results of this test are illustrated in FIG. 12 which shows graphically the capabilities of network according to the present invention to converge on difficult tasks.

In analysing the behaviour of the artificial neural network according to the present invention it is worth to underline the behaviour from the point of view of weights. From the simple rule $\sin(x) \cong x$ per $x \in [0,.2]$, it appears evident that with small weights the connections according to the network of the present invention transform themselves to a simpler back-propagation network connection according to the state of the art.

It's interesting to look how the artificial neural network according to the present invention uses non-linearity on weights connection while learning from simple to harder problem. In next figures the plot of function that characterizes each single connection in the artificial neural network according to the invention with an input range [0,1], addenda of sum in equation (5) is shown.

In FIG. 13 weights are illustrated coming from input to the hidden nodes weights of sine, here the difference from the simple linear relation of the Back-propagation network according to the state of the art isn't so strong, but analyzing the weight from hidden to output nodes (illustrated in FIG. 14) it appears evident the non-linear and non monotonic behaviour of connection on action of the artificial neural network according to the present invention.

In FIGS. 15 and 16, functions on input-hidden and hidden-output weights are represented. Increasing complexity of the problem faced, the 64-spiral problem, it can be seen the artificial neural network according to the invention uses more non-linearity on connections thus accentuating the difference with networks using linear relations on connections.

In the following the behaviour of the neural network according to the present invention and the behaviour of a classic Back-propagation neural network are analyzed by means of a trial on two real and complex databases.

The databases of this two further examples are available on the Internet and the selected dataset are:

The breast cancer databases was obtained from the University of Wisconsin Hospitals, Madison from Dr. William H. Wolberg The Australian Credit Scoring database available in the Statlog project To perform analysis of this dataset a cross-validation approach was chosen. As requested in the documentation, for the Breast Cancer DB a 9-fold cross-validation was chosen while for the Australian Credit Scoring DB a 10-fold cross-validation was chosen.

The use of K-folds cross-validation is due to the explicit request coming with the alleged documentation of the datasets. Because this approach could be weak about first type error in algorithms performance comparison an half sample cross-validation has been also carried out that has confirmed results reported here.

The Breast Cancer Database

The characteristics of this database are briefly summarized hereinafter:

Title: Wisconsin Breast Cancer Database

Number of Instances: 699

Number of Attributes: 10 plus the class attribute (benign, malignant)

Class distribution: Benign: 458 (65.5%)—Malignant: 241 (34.5%)

The network configuration were for Back-propagation network sigmoidal activation and Softmax function for the output nodes, one node for malignant class and one node for benignant. (see deeper detail in Mangasarian O. L. and Wolberg W. H., (1990), "Cancer diagnosis via linear programming", SIAM News, Volume 23, Number 5, September 1990, pp 1 & 18).

For the artificial neural network according to the present invention the same configuration has been used.

Two approaches has been used. The first was a 9-fold cross validation with 629 observations in the training set and 70 observation in the prediction, to analyse capabilities of the network according to the present invention with regard to the over-fitting properties, and a second one was a 9 fold cross-validation approach obtaining 629 observations for the tuning set and 70 observations for the prediction set; the tuning set has been divided in training set (315) and testing set (314) to perform an "Early Stopping" approach to reduce the over-fitting phenomenon as described with deeper detail in Sarle W. S., (1995), "Stopped Training and Other Remedies for Overfitting," to appear in Proceedings of the 27th Symposium on the Interface, 1995.

During the first experiment four different architectures for networks involved with 4, 8, 12 and 16 hidden units has been tested in order to evaluate results sensibility on hidden units number.

The following table illustrates the Accuracy Weighted Mean on Breast Cancer Dataset

| | Model | |
|---|---|---|
| Hidden | Bp | SN |
| 04 | 0.9525 | 0.9612 |
| 08 | 0.9481 | 0.9662 |
| 12 | 0.9519 | 0.9660 |
| 16 | 0.9543 | 0.9648 |

The following table illustrates the Accuracy Variance on Breast Cancer Dataset

| | Model | |
|---|---|---|
| Hidden | Bp | SN |
| 04 | 0.0083 | 0.0072 |
| 08 | 0.0106 | 0.0070 |
| 12 | 0.0095 | 0.0078 |
| 16 | 0.0097 | 0.0076 |

In the two tables as well as in several of the annexed figures the artificial neural network according to the present invention is indicated as SN or SN network or Sine Net, while the classic Back propagation network according to the state of the art is defined as Bp.

About absolute performance the network according to the present invention get better results in all configurations obtaining also in a lower variance of outcomes. This means that the network according to the present invention is more reliable about over-fitting compared to classic Back-propagation networks. It appears also evident that the variability of results are lower in the network according to the present invention versus classic Back-propagation network. This fact underlines that the network according to the present invention is less sensitive about number of hidden units.

This result is illustrated graphically in FIG. 17 were it is represented the comparison between a classic Back-propagation network and the network according to the present invention during the first trial relatively to the correctness on hidden units number FIG. 18 represents the result of the comparison between a classic Back-propagation network and the network according to the invention on the Breast Cancer dataset. By comparing the weighted means of the correct hidden units versus the hidden units number.

A further experimental test was carried out, with 12 hidden units and using "Early stopping". This further experimental test confirms result showed in FIG. 18. Here the Back-propagation network had a larger improvement than the network according to the present invention stressing the better performances of the network according to the invention against over-fitting.

FIG. 19 illustrates analogously to FIG. 18 the result of the comparison between the classic Back-propagation network and the network according to the invention on the Breast Cancer dataset using "Early Stopping"

The Australian Credit Scoring database

Title: Australian Credit Approval

Number of Instances: 690

Number of Attributes: 14+class attribute (good/bad)

Class Distribution: Class2: 307 (44.5%), Class1: 383 (55.5%)

This data set concerns credit card applications. Two approaches has been used to examine this dataset. A 10-fold cross-validation with train and prediction, and a 10-fold cross-validation with train, test and prediction using early stopping against over-fitting. The network configurations were the same as in Breast Cancer experiment.

The results of the first trial, with number of hidden units 4, 8, 12, 16 are summarized in FIG. 20 and the following table 5.

| | 10 Folds CV | |
|---|---|---|
| Hidden | Bp | SN |
| 04 | 0.8146 | 0.8573 |
| 08 | 0.8333 | 0.8449 |
| 12 | 0.7981 | 0.8512 |
| 16 | 0.8220 | 0.8525 |

Table 5 illustrates the comparison between a classic Back-propagation network Bp and the network according to the invention called SN network during the first trial and related to correctness on hidden units number.

FIG. 20 is a graphic representation of the results of table 5.

Similarly to the preceding experimental test in the second trial 12 hidden units were used, and the comparison between result of the first trial are reported in table 6 and FIG. 21.

|  | Tr-Pr | | Tr-Ts-Pr | |
| --- | --- | --- | --- | --- |
|  | BP | SN | BP | SN |
| Mean | 0.8146 | 0.8573 | 0.8629 | 0.8653 |
| Var | 0.0022 | 0.0018 | 0.00337 | 0.002411 |

Table 6 summarizes the result of the comparison between a classic Back-propagation network BP and the network according to the present invention SN on the Australian Credit Scoring dataset, with "Early Stopping" (Training-Testing-Prediction) and without (Training-Prediction). FIG. 21 is a graphic representation of the results of table 6.

Absolute results and comparison between the first and the second trial confirms outcomes obtained with Breast Cancer dataset: namely better result of the network according to the invention with smaller variance and a larger difference of correctness between the first and the second trial for the Back-propagation network, suggesting the better behavior of network according to the invention about over-fitting problem.

The invention claimed is:

1. A neural network comprising:
a plurality of nodes forming at least two layers, a first such layer being an input layer and a last such layer being an output layer, said input layer nodes and said output layer nodes being communicably connected;
wherein, in operation, input data from a database is input to said input layer, and the results of processing said data are output from the output layer, the output layer nodes forming output channels;
wherein each node of the output layer outputs a transformation into output data of the input data received from the input layer, said transformation comprising:
a first transformation step comprising at least one sub-step summing the input data received from the input nodes to said output nodes by weighting the said input data, and
a second transformation step which nonlinearly transforms the results of the first transformation step,
wherein in each output node said first transformation step comprises two substeps:
a first sub-step being a nonlinear transformation function of the input data received by the output nodes from the input nodes, and
the second sub-step being said summing step of said input data which has been nonlinearly transformed in said first sub-step, and
wherein said neural network is implemented in a computer having a processor and memory, said computer arranged to input the data from the database to the input layer, perform the summing and transformations of data at each node of the output layer and provide the output data to a user.

2. A neural network according to claim 1, wherein the input layer has a predetermined number of input nodes and the output layer has a predetermined number of output nodes;
wherein between the input and the output layer there is provided at least one further hidden layer of nodes, the nodes of said hidden layer being connected by weighted connection to the input nodes of the input layer and to the nodes of a further hidden layer when more than one hidden layer is provided or to the output nodes of the output layer, if only one hidden layer is provided;
wherein each node of the at least one hidden layer or of the more than one hidden layers and the nodes of the output layer carry out a transformation of the input data received from the input layer, or from a preceding hidden layer, into output data, said transformation comprising:
a first transformation step consisting in two subsequent sub-steps:
a first sub-step consisting a nonlinear transformation function of the input data received by the output nodes, or by the nodes of a hidden layer, from the input nodes of the input layer or by the nodes of the preceding hidden layer, and
a second sub-step comprising summing the said input data being nonlinearly transformed in the first sub-step by further weighting the said nonlinearly transformed input data, and
a second transformation step which transforms nonlinearly the results obtained by the first transformation step,
wherein the output data obtained by said transformation carried out in said nodes being the output data if the nodes are the output nodes of the output layer or the input data furnished from the nodes of a hidden layer to the nodes of a following hidden layer or to the output nodes of the output layer, and
wherein the computer is further arranged to furnish data to, perform the transformations at, and output data from, each node of each hidden layer.

3. A neural network according to claim 2, wherein the outputs from the input layer are furnished as input data to one of:
the nodes of the output layer, the nodes of a first hidden layer, and the nodes of a single and
wherein the output data of the output layer comprises the processing results of the neural network.

4. A neural network according to claim 2, wherein each node of the at least one hidden layer and of the output layer comprises several input channels for different input data;
to each channel being associated a receiver unit for carrying out the first nonlinear transformation sub-step of the first transformation step;
a summation unit being further provided having an input connected to the outputs of the receiver unit of each channel and for carrying out the second transformation sub-step of the first transformation step by summing the nonlinearly transformed input data of each channel to a value and a nonlinear transformation unit having an input connected to an output of the summation unit for carrying out the second transformation step by nonlinear filtering of the value obtained by the first transformation step and furnishing the output value of the node which is the input value of the nodes of a following hidden or of the output layer.

5. A neural network according to claim 1, wherein the first sub-step of the first transformation step of input data carried out by a node comprises a transformation of the input data by a sinusoidal function and the second transformation sub-step consists in the summing of the input data after said transformation by the sinusoidal function after having carried out said first transformation sub-step.

6. A neural network according to claim 5, wherein input data comprises a predetermined number of variables in a input data variable space, each variable being defined by coordinates in the input data space and each coordinate in the input data space being nonlinearly transformed in the first transformation step to a corresponding variable value which is made dependent upon the spatial position of the coordinate value with respect to a spatial wave of given wavelength, said dependence consisting in multiplying the input coordinate values by the wavelength of a sinusoidal wave which are then transformed into the same value, the wavelength of each input coordinate being tuned during the learning phase.

7. A neural network according to claim 5, wherein the transformation of the input data carried out by each node is defined by the following equation $$x_j^{[s]} = F(G(w_{ji}^{[s]} \cdot x_i^{[s-1]})) \tag{4}$$

wherein the nonlinear transformation F(•) is the nonlinear filtering function of the second transformation step and G(•) is the combination of the nonlinear transformation function of the first transformation sub-step and of the second linear transformation sub-step comprising the sum of the non-monotonically, sinusoidal processed weighted inputs according to the following function:

$$G(w_{ji}^{[s]}, x_i^{[s-1]}) = \sum_{i=0}^{n} \sin(w_{ji}^{[s]} \cdot x_i^{[s-1]}) \tag{5}$$

wherein

[s] is the generic layer of the network, with s=1 for the input layer and increasing values for the hidden and output layers;

$x_j^{[s]}$ is the output variable of the j-th node in layer [s];

$x_i^{[s-1]}$ is the i-th input to the generic node in layer [s]] from the i-th node in layer [s−1];

$x_0^{[s-1]}$ is a "false" input to the generic node in layer [s], artificially introduced to represent, in a mathematically convenient way, a useful threshold value which is usually fixed to 1;

$w_{ji}^{[s]}$ is the weight on the connection joining the i-th node in layer [s−1] to the j-th node in layer [s]; and n is the number of inputs to the node.

8. A neural network according to claim 5, wherein each node carries out a transformation of the input data according to the following function:

$$x_j^{[s]} = F\left(\sum_{i=0}^{n} \sin(w_{ji}^{[s]} \cdot x_i^{[s-1]})\right), \tag{6}$$

the sine function introducing a qualitative process as each weight $w_{ji}^{[s]}$ plays as a 2π/wavelength parameter in the i-th coordinate of the input space of the j-th node of the s-th layer.

9. A neural network according to claim 5, wherein the second nonlinear transformation step is carried out by a sigmoid function.

10. A neural network according to claim 5, wherein said neural network is a multilayer back propagation neural network comprising a forward phase and a learning phase which uses a gradient descent principle, the forward phase being defined by the following equations:

a first harmonic transformation step furnishing the transformed net input value I where $$I_j^{[s]} = \frac{2\pi}{n}\left(\sum_{i=0}^{n} \sin(w_{ji}^{[s]} \cdot x_i^{[s-1]})\right), \tag{7}$$

a second non linear transformation step by means of a so called activation function $f(I_j^{[s]})$ determining the output of the node according to the equation:

$$I_j^{[s]} = f(I_j^{[s]}) = f\left(\frac{2\pi}{n} \sum_i \sin(w_{ji}^{[s]} \cdot x_i^{[s-1]})\right), \tag{8}$$

and the learning phase being defined by the following equations:

the gradient descent principle $$\Delta w_{ji}^{[s]} = -lcoef \cdot \frac{\partial E}{\partial w_{ji}^{[s]}}, \tag{10}$$

with usual Global Error functions, the error on each node being evaluated by defining the local error according to the equation:

$$e_j^{[s]} = -\frac{\partial E}{\partial I_j^{[s]}}, \tag{12}$$

thus obtaining:

$$\begin{aligned}\Delta w_{ji}^{[s]} &= -locoef \cdot \frac{\partial E}{\partial w_{ji}^{[s]}} \\ &= -lcoef \cdot \frac{\partial E}{\partial I_j^{[s]}} \cdot \frac{\partial I_j^{[s]}}{\partial w_{ji}^{[s]}},\end{aligned} \tag{13}$$

and for determining the weights correction value, the local error $e_j^{[s]}$ being calculated as follows:

for the output layer:

$$e_j^{[out]} = -\frac{\partial E}{\partial I_j^{[out]}} =, \tag{14}$$

and for the other layers:

$$\begin{aligned}e_j^{[s]} &= -\frac{\partial E}{\partial I_j^{[s]}} = \\ &= -\frac{\partial E}{\partial I_j^{[s]}} \cdot \frac{\partial x_j^{[s]}}{\partial I_j^{[s]}} = \\ &= -f'(I_j^{[s]}) \cdot \sum_k \left(\frac{\partial E}{\partial I_k^{[s+1]}} \cdot \frac{\partial I_k^{[s+1]}}{\partial x_k^{[s]}}\right).\end{aligned} \tag{15}$$

11. A neural network according to claim 5, further comprising:
- a receiving channel for input data;
- a receiver unit associated to the said receiving channel for carrying out the first non linear transformation sub-step of the first transformation step;
- a summation unit for carrying out the second transformation sub-step of the first transformation step by summing the non linearly transformed input data of each channel to a value; and
- a non linear transformation unit for carrying out the second transformation step by non linear filtering of the value obtained by the first transformation step as defined by the previous step and furnishing the output value of the input nodes node which is the input value of the nodes of a following hidden or of the output layer.

12. A neural network according to claim 10, wherein the activation function of the forward phase $f(I_j^{[s]})$ is the sigmoidal function $$x_j^{[s]} = sigm(I_j^{[s]}) = (1+x)^n = \frac{1}{1+e^{-I_j^{[s]}}}, \quad (9)$$

the error function of the learning phase is the Medium Square Error function $$E = \frac{1}{2} \cdot \sum_{k=1}^{m} (t_k - x_k^{[out]})^2, \quad (11)$$

the weight correction value for the output layer becoming $$-\left(\frac{\partial}{\partial I_k^{[out]}} f(I_j^{[out]})\right) \cdot \left(\frac{\partial}{\partial x_j^{[out]}}\left(\frac{1}{2}\sum_{k=1}^{m}(t_k - x_k^{[out]})^2\right)\right)$$

and the weight correction value for the other layers becoming $$-f'(I_j^{[s]}) \cdot \sum_k \left(-e_k^{[s+1]} \cdot \frac{\partial}{\partial x_j^{[s]}}\left(\frac{2\pi}{n}\sum_h (\sin(w_{kh}^{[s+1]} \cdot x_h^{[s]}))\right)\right) =$$
$$-f'(I_j^{[s]}) \cdot \frac{2\pi}{n} \sum_k (e_k^{[s+1]} \cdot w_{kj}^{[s+1]} \cdot \cos(w_{kj}^{[s+1]} \cdot x_j^{[s]})).$$

13. A neural network according to claim 10, further comprising:
- a receiving channel for input data;
- a receiver unit associated to said receiving channel for carrying out the first non linear transformation sub-step of the first transformation step;
- a summation unit for carrying out the second transformation sub-step of the first transformation step by summing the non linearly transformed input data of each channel to a value; and
- a non linear transformation unit for carrying out the second transformation step by non linear filtering of the value obtained by the first transformation step as defined by the previous step and furnishing the output value of the input nodes node which is the input value of the nodes of a following hidden or of the output layer.

14. A neural network according to claim 12, further comprising:
- a receiving channel for input data; a receiver unit associated to said receiving channel for carrying out the first non linear transformation sub-step of the first transformation step;
- a summation unit for carrying out the second transformation sub-step of the first transformation step by summing the non linearly transformed input data of each channel to a value; and
- a non linear transformation unit for carrying out the second transformation step by non linear filtering of the value obtained by the first transformation step as defined by the previous step and furnishing the output value of the input nodes node which is the input value of the nodes of a following hidden or of the output layer.

15. A neural network according to claim 1, wherein said input data is data that has been acquired from a real world phenomenon, process or measurement, or is designed to model, represent, approximate or express a real world phenomenon, process or measurement.

16. A non-transitory program storage device readable by a machine, tangibly embodying a program of instructions executable by the machine to perform a method for processing a set of input data, the method step comprising:
- providing a plurality of nodes forming at least two layers, a first such layer being an input layer and a last such layer being an output layer, said input layer nodes and said output layer nodes being communicably connected;
- inputting input data from a database to said input layer, and outputting the results of processing said data from the output layer, the output layer nodes forming output channels;
- wherein each node of the output layer outputs a transformation into output data of the input data received from the input layer, said transformation comprising:
- a first transformation step comprising at least one sub-step consisting in summing the input data received from the input nodes to said output nodes by weighting the said input data, and
- a second transformation step which nonlinearly transforms the results of the first transformation step,
- wherein in each output node said first transformation step comprises two sub-steps:
- a first sub-step being a nonlinear transformation function of the input data received by the output nodes from the input nodes, and
- the second sub-step being said summing step of the said input data which has been nonlinearly transformed in the said first sub-step.

* * * * *